United States Patent Office.

FRIEDRICH BAYER, OF ELBERFELD, GERMANY, ASSIGNOR TO THE FARBEN-FABRIKEN, VORMALS FRIEDR. BAYER & CO., OF SAME PLACE.

YELLOW-RED DYE-STUFF FROM TETRAZO-DIPHENYL.

SPECIFICATION forming part of Letters Patent No. 362,813, dated May 10, 1887.

Application filed January 17, 1887. Serial No. 224,601. (Specimens.)

*To all whom it may concern:*

Be it known that I, FRIEDRICH BAYER, a subject of the King of Prussia, residing at Elberfeld, in the Empire of Germany, director of and assignor to the FARBENFABRIKEN, vormals FRIEDR. BAYER & CO., have invented a new and useful Improvement in the Manufacture of Dye-Stuffs or Coloring-Matters, of which the following is a specification.

My invention relates to the production of a new yellowish-red coloring-matter for dyeing unmordanted cotton in an alkaline or soap bath by the action of the tetrazo compound of benzidine upon the new sulphonic acid of the beta-naphthylamine, which I have called "beta-naphthylamine deltamonosulphonic acid."

In carrying out my process to produce the new coloring-matter practically I proceed as follows: Fifty kilos benzidinesulphate are suspended in a finely-comminuted condition in water. To this fifty kilos of muriatic acid of 21° Baumé are added, and when this solution is cooled by ice 22.2 kilos of sodiumnitrite dissolved in water are gradually added. In this way a solution of tetrazo-diphenyl chloride is formed. If this solution is now poured into seventy-three kilos of beta-naphthylamine deltamonosulphonic acid suspended in a finely-comminuted condition in water, blending the free mineral acid by the addition of acetate of soda, a dark-brown precipitate is obtained, which, after having been warmed, is transformed into its alkaline salt. The dye-stuff thus obtained of the composition

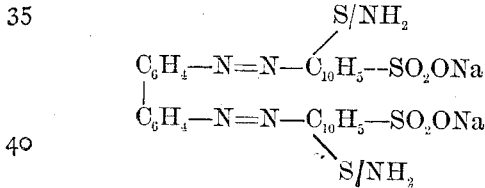

forms a red amorphous powder, which is easily soluble in hot water, and distinguished thus very materially from the dye-stuff of the benzidine and the other beta-naphthylamine monosulphonic acid.

The aqueous solutions are not changed by acetic acid, but by an addition of muriatic acid a brown precipitate forms of the free acid of the dye-stuff. With concentrated sulphuric acid the dye-stuff dissolves into a full blue color.

Cotton is dyed without any mordant a very fine yellowish red in an alkaline bath.

What I claim as my invention, and desire to secure by Letters Patent, is—

The yellowish-red coloring-matter herein described having the following characteristics: it exists as a red amorphous powder easily soluble in hot water, its aqueous solutions are not changed by acetic acid, but by the addition of muriatic acid a brown precipitate of the free acid of the dye-stuff is formed, with concentrated sulphuric acid the dye-stuff dissolves into a full blue color, cotton is dyed without any mordant a very fine yellowish red in an alkaline bath.

In testimony whereof I have signed my name to this specification in the presence of two subscribing witnesses.

FRIED. BAYER.

Witnesses:
WM. A. POLLOCK,
GEO. T. CURTIS, Jr.